US010038529B2

(12) United States Patent
Wang et al.

(10) Patent No.: US 10,038,529 B2
(45) Date of Patent: Jul. 31, 2018

(54) BASE STATION APPARATUS, TERMINAL APPARATUS, TRANSMITTING METHOD, AND RECEIVING METHOD

(71) Applicant: Sun Patent Trust, New York, NY (US)

(72) Inventors: Lilei Wang, Beijing (CN); Ayako Horiuchi, Kanagawa (JP); Hidetoshi Suzuki, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 88 days.

(21) Appl. No.: 14/903,044

(22) PCT Filed: Aug. 7, 2013

(86) PCT No.: PCT/CN2013/080995
§ 371 (c)(1),
(2) Date: Jan. 5, 2016

(87) PCT Pub. No.: WO2015/018005
PCT Pub. Date: Feb. 12, 2015

(65) Prior Publication Data
US 2016/0164653 A1 Jun. 9, 2016

(51) Int. Cl.
H04W 72/04 (2009.01)
H04L 5/00 (2006.01)
H04J 11/00 (2006.01)

(52) U.S. Cl.
CPC ........ *H04L 5/0048* (2013.01); *H04J 11/0073* (2013.01); *H04L 5/0053* (2013.01); *H04W 72/042* (2013.01)

(58) Field of Classification Search
CPC .. H04L 5/0048; H04L 5/0053; H04W 72/042; H04J 11/0073
See application file for complete search history.

(56) References Cited

U.S. PATENT DOCUMENTS 9,455,814 B2 * 9/2016 Kim .................. H04L 5/0025
9,553,701 B2 1/2017 Sadeghi et al.
2012/0122495 A1 * 5/2012 Weng ................ H04W 68/025
455/458
2013/0182664 A1 7/2013 Chen et al.
(Continued)

FOREIGN PATENT DOCUMENTS

WO 2012/165877 A2 12/2012
WO 2013/026345 A1 2/2013
(Continued)

OTHER PUBLICATIONS

Extended European Search Report, dated Jul. 15, 2016, for corresponding EP Application No. 13890902.3-1851 / 3031264, 7 pages.
(Continued)

*Primary Examiner* — Jay P Patel
(74) *Attorney, Agent, or Firm* — Seed IP Law Group LLP

(57) ABSTRACT

Disclosed is a base station apparatus which allows an idle mode UE, in a small cell using S-NCT, to recognize the small cell and to receive a DCI. The base station apparatus is configured to use a carrier configuration which has no region for mapping a PDCCH and in which an EPDCCH is mapped in a data region. The base station apparatus includes: master information generating section 101 configured to generate allocation information indicating a resource which forms a search space in the EPDCCH and being scrambled with a cell ID of the base station apparatus; and transmitting section 107 configured to transmit the allocation information, a detection signal indicating the cell ID, and a control signal assigned in the search space.

16 Claims, 15 Drawing Sheets

(56) References Cited

U.S. PATENT DOCUMENTS

| | | | |
|---|---|---|---|
| 2013/0201964 A1* | 8/2013 | Kim | H04W 72/0453 370/335 |
| 2013/0203450 A1* | 8/2013 | Mochizuki | H04W 68/02 455/458 |
| 2014/0086173 A1 | 3/2014 | Sadeghi et al. | |
| 2014/0105156 A1 | 4/2014 | Jang et al. | |
| 2014/0286277 A1 | 9/2014 | Jang et al. | |
| 2015/0146644 A1* | 5/2015 | Kim | H04L 5/0048 370/329 |
| 2015/0173054 A1* | 6/2015 | Ohta | H04W 72/042 370/329 |
| 2015/0207601 A1* | 7/2015 | Kim | H04L 5/0048 370/329 |
| 2016/0006546 A1* | 1/2016 | Yi | H04L 5/001 370/329 |
| 2017/0111884 A1 | 4/2017 | Sadeghi et al. | |

FOREIGN PATENT DOCUMENTS

| | | |
|---|---|---|
| WO | 2013/066100 A1 | 5/2013 |
| WO | 2014/052412 A2 | 4/2014 |
| WO | 2014/052412 A3 | 4/2014 |

OTHER PUBLICATIONS

3GPP TR 36.872 V1.0.0, "3rd Generation Partnership Project; Technical Specification Group Radio Access Network; Small cell enhancements for E-UTRA and E-UTRAN—Physical layer aspects (Release 12)," Aug. 2013, 79 pages.

Fujitsu, "Summary of email discussion on CSS for ePDCCH," R1-121193, 3GPP TSG-RAN WG1#68bis, Agenda Item: 7.6.2. Jeju, Korea, Mar. 26-30, 2012, 17 pages.

Huawei, HiSilicon, "Discussion on ePDCCH Common search space," R1-120997, 3GPP TSG RAN WG1 Meeting #68bis, Agenda Item: 7.6.2, Jeju, Korea, Mar. 26-30, 2012, 3 pages.

International Search Report dated Mar. 27, 2014, for corresponding International Application No. PCT/CN2013/080995, 2 pages.

LG Electronics, "Signaling Mechanism for dynamic TDD UL-DL reconfiguration," R1-131292, 3GPP TSG RAN WG1 Meeting #72bis, Agenda item: 7.2.3.2, Chicago, USA, Apr. 15-19, 2013, 8 pages.

Communication pursuant to Article 94(3) EPC, dated Feb. 20, 2018, for corresponding European Patent Application No. 13 890 902.3-1219, 7 pages.

* cited by examiner

| MHz | N_RB | THE NUMBER OF RBs OF EPDCCH CSS |
|---|---|---|
| 1.4 | 6 | 1 or 2 |
| 3 | 15 | 1 or 2 |
| 5 | 25 | 2 or 4 |
| 10 | 50 | 2 or 4 |
| 15 | 75 | 4 or 8 |
| 20 | 100 | 4 or 8 |

FIG. 6

| VRB | PRB |
|---|---|
| 0 | 0 |
| 1 | 4 |
| 2 | 8 |
| 3 | 12 |
| 4 | 16 |
| 5 | 20 |
| 6 | 1 |
| 7 | 5 |
| 8 | 9 |
| 9 | 13 |
| 10 | 17 |
| 11 | 21 |
| 12 | 2 |
| 13 | 6 |
| 14 | 10 |
| 15 | 14 |
| 16 | 18 |
| 17 | 22 |
| 18 | 3 |
| 19 | 7 |
| 20 | 11 |
| 21 | 15 |
| 22 | 19 |
| 23 | 23 |
| 24 | N/A |

FIG. 7

| NUMBER OF RBs | NUMBER OF ECCEs | AL1 | AL2 | AL4 | AL8 | AL16 |
|---|---|---|---|---|---|---|
| 1 | 4 | 3 | 2 | 1 | | |
| 2 | 8 | | 3 | 2 | 1 | |
| 4 | 16 | | | 4 | 2 | |
| 8 | 32 | | | 3 | 2 | 1 |

FIG. 8

| VRB | PRB |
|---|---|
| 0 | 0 |
| 1 | 4 |
| 2 | 8 |
| 3 | 12 |
| 4 | 16 |
| 5 | 20 |
| 6 | 1 |
| 7 | 5 |
| 8 | 9 |
| 9 | 13 |
| 10 | 17 |
| 11 | 21 |
| 12 | 2 |
| 13 | 6 |
| 14 | 10 |
| 15 | 14 |
| 16 | 18 |
| 17 | 22 |
| 18 | 3 |
| 19 | 7 |
| 20 | 11 |
| 21 | 15 |
| 22 | 19 |
| 23 | 23 |
| 24 | N/A |

FIG. 9

| VRB | PRB |
|---|---|
| 0 | 0 |
| 1 | 4 |
| 2 | 8 |
| 3 | 12 |
| 4 | 16 |
| 5 | 20 |
| 6 | 1 |
| 7 | 5 |
| 8 | 9 |
| 9 | 13 |
| 10 | 17 |
| 11 | 21 |
| 12 | 2 |
| 13 | 6 |
| 14 | 10 |
| 15 | 14 |
| 16 | 18 |
| 17 | 22 |
| 18 | 3 |
| 19 | 7 |
| 20 | 11 |
| 21 | 15 |
| 22 | 19 |
| 23 | 23 |
| 24 | N/A |

DISCOVERY SIGNAL

EPDCCH CSS

BASE STATION APPARATUS, TERMINAL APPARATUS, TRANSMITTING METHOD, AND RECEIVING METHOD

TECHNICAL FIELD

The present invention relates to a base station apparatus, a terminal apparatus, a transmitting method, and a receiving method.

BACKGROUND ART

In recent years, it has become almost common to transmit not only speech data but also large volume data such as still image data and moving image data, along with the increasing adoption of multimedia-enabled information in cellular mobile communication systems. Meanwhile, studies have been actively carried out to achieve a higher transmission-rate using a wide radio band, multiple-input multiple-output (MIMO) transmission technology, and interference control technique in long-term evolution advanced (LTE-Advanced).

In addition, studies have been carried out to achieve a higher transmission rate at hotspots through the deployment of small cells, each being a base station using low transmission power (may be referred to as "eNB") in a cellular mobile communication system in LTE-Advanced. In addition, allocating a frequency different from that for macro cells as a carrier frequency for operating small cells has been under study (see Non-Patent Literature (hereinafter, abbreviated as "NPL") 1).

In addition, operating small cells by using a carrier configuration called "New Carrier Type (NCT)," which is different from the carrier configuration used until LTE-Advanced Rel. 11 (i.e., Backward Compatible Carrier (BCT), see FIG. 1A, for example), has been under discussion. In NCT, studies have been carried out on reducing a physical downlink control channel (PDCCH) and a cell specific reference signal (CRS) transmitted in BCT and using an enhanced PDCCH (EPDCCH) for transmission of a downlink (DL) control signal and using a demodulation reference signal (DMRS) for demodulation of a signal (see, FIG. 1B, for example). An EPDCCH is mapped in a data region, and the base station is capable of specifying a frequency resource and then transmitting the EPDCCH. Accordingly, the transmission using an EPDCCH enables controlling transmission power for a control signal, or controlling interference given to a different cell by the control signal to be transmitted, or controlling interference given to a cell of the base station from a different cell.

In addition, studies have been carried out on a situation where terminals (UE: User Equipment) are connected to both a macro cell and small cell and also on a situation where UEs are connected to only a small cell. The carrier to be used in a small cell in the situation where terminals (UE: User Equipment) are connected to both a macro cell and small cell is called "Non-standalone-NCT (NS-NCT)." Meanwhile, the carrier to be used in a small cell in the situation where UEs are connected to only a small cell is called "standalone-NCT (S-NCT)."

When a UE connects to a small cell using NS-NCT, it is likely that the UE connects to a macro cell first and is then instructed by the macro cell to connect to the small cell using NS-NCT. Thus, small cells using NS-NCT can perform processing to connect UEs with support from a macro cell.

Meanwhile, since small cells using S-NCT receive no support from a macro cell, the small cells themselves need to allow UEs to connect to the small cells. In addition, the small cells using S-NCT are expected to support not only connective mode UEs, but also idle mode UEs performing no data communication. The possibility of implementing this configuration has been under discussion as well. To put it differently, the small cells each using S-NCT need to be configured to transmit information to idle mode UEs in order for the idle mode UEs to recognize the presence of small cell (e.g., cell detection), when S-NCT is used.

In BCT in which a macro cell is put into operation, each idle mode UE performs synchronization and cell detection using a primary synchronization signal (PSS)/secondary synchronization signal (SSS). After acquisition of the cell ID of a macro cell, the idle mode UE receives a master information block (MIB) and thereby acquires a transmission band, physical HARQ indicator channel (PHICH) mapping information, and a frame number and/or the like. Thereafter, the UE monitors a common search space (CSS) on a PDCCH configured with a shift pattern defined the cell ID, and blindly detects downlink control information pieces (DCIs) on the system information, paging, and a random access channel (RACH). The DCIs on the system information, paging, and RACH are masked with SI-RNTI, P-RNTI, and RA-RNTI or the like, respectively. Note that, the eNB does not recognize that idle mode UEs monitor the cell provided by the eNB, so that the eNB cannot transmit information to the idle mode UEs, using a UE-specific control signal.

CITATION LIST

Non-Patent Literatures

NPL 1
3GPP TR 36.872 V0.3.0, "Small Cell Enhancements for E-UTRA and E-UTRAN Physical Layer Aspects"

NPL 2
R1-121193, "Summary of email discussion on CSS for ePDCCH," Fujitsu

SUMMARY OF INVENTION

Technical Problem

As in BCT, in a small cell using S-NCT, a system is also needed, which allows an idle mode UE to recognize the small cell and to receive the DCIs on the system information, paging, and RACH. However, as described above, no PDCCH is transmitted in NCT (see FIG. 1B). For this reason, in NCT, a CSS needs to be configured on an EPDCCH (hereinafter, referred to as "EPDCCH-CSS") to allow UEs to receive the DCIs on the system information, paging, and RACH on the EPDCCH-CSS. In this configuration, the EPDCCH-CSS needs to be configured so as to allow UEs to recognize the EPDCCH-CSS without a UE-specific control signal and to monitor the EPDCCH-CSS. In addition, a system that allows idle mode UEs to acquire the RB number and the number of RBs to which the EPDCCH is mapped. Providing a CSS in EPDCCH has been studied once in BCT in Rel. 11 (see NPL 2), but it has been decided not to introduce a CSS in EPDCCH in Rel. 11. In this study, providing a CSS in EPDCCH has been discussed with the assumption that the EPDCCH CSS is mainly targeted for connected UEs and also that the resources for the EPDCCH CSS are indicated by higher layer signaling.

It is an object of the present invention to provide a base station apparatus, a terminal apparatus, a transmitting method, and a receiving method each allowing, in a small cell using S-NCT, an idle mode UE to recognize the small cell and thereby to receive a DCI.

Solution to Problem

A base station apparatus according to an aspect of the present invention is a base station apparatus using a carrier configuration which includes no region for mapping a physical downlink control channel (PDCCH) and in which an enhanced physical downlink control channel (EPDCCH) is mapped in a data region, the base station apparatus including: a generating section that generates allocation information indicating one or more resources which form a search space in the EPDCCH and being scrambled with a cell ID of the base station apparatus; and a transmitting section that transmits the allocation information, a detection signal indicating the cell ID, and a control signal assigned in the search space.

A terminal apparatus according to an aspect of the present invention includes: a detection section that detects a detection signal from a received signal transmitted from a base station apparatus using a carrier configuration which includes no region for mapping a physical downlink control channel (PDCCH) and in which an enhanced physical downlink control channel (EPDCCH) is mapped in a data region, the detection signal indicating a cell ID of the base station apparatus; a first receiving section that extracts allocation information from the received signal, using the cell ID, the allocation information indicating one or more resources which form a search space in the EPDCCH; and a second receiving section that extracts a control signal from the received signal by performing blind-decoding with respect to the search space.

A transmitting method according to an aspect of the present invention is a transmitting method in a base station apparatus using a carrier configuration which includes no region for mapping a physical downlink control channel (PDCCH) and in which an enhanced physical downlink control channel (EPDCCH) is mapped in a data region, the transmitting method including: generating allocation information indicating one or more resources which form a search space in the EPDCCH and being scrambled with a cell ID of the base station apparatus; and transmitting the allocation information, a detection signal indicating the cell ID, and a control signal assigned in the search space.

A receiving method according to an aspect of the present invention includes: detecting a detection signal from a received signal transmitted from a base station apparatus using a carrier configuration which includes no region for mapping a physical downlink control channel (PDCCH) and in which an enhanced physical downlink control channel (EPDCCH) is mapped in a data region, the detection signal indicating a cell ID of the base station apparatus; extracting allocation information from the received signal, using the cell ID, the allocation information indicating one or more resources which form a search space in the EPDCCH; and extracting a control signal from the received signal by performing blind-decoding with respect to the search space.

Advantageous Effects of Invention

According to the present invention, in a small cell using S-NCT, an idle mode UE can recognize the small cell and receive a DCI.

BRIEF DESCRIPTION OF DRAWINGS

FIG. 6 is a diagram illustrating a correspondence between the transmission bandwidth and the number of RBs of EPDCCH CSS according to Embodiment 1 of the present invention;

FIG. 7 is a diagram illustrating a mapping example of an EPDCCH CSS according to Embodiment 1;

FIG. 8 is a diagram illustrating an EPDCCH CSS mapping method according to a variation of Embodiment 1 of the present invention;

FIG. 9 is a diagram illustrating an EPDCCH CSS mapping method according to another variation of Embodiment 1 of the present invention;

FIG. 14 is a diagram illustrating still another EPDCCH CSS mapping method according to Embodiment 2 of the present invention (Operation Example 3);

FIG. 16 is a diagram illustrating the EPDCCH CSS mapping method according to Embodiment 2 of the present invention (Operation Example 3).

DESCRIPTION OF EMBODIMENTS

Figure 1B:
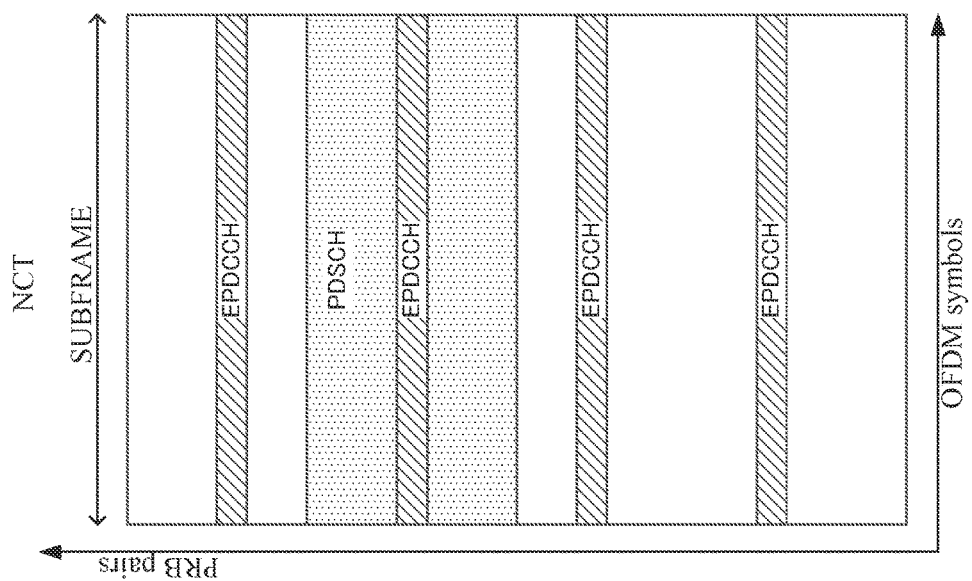
FIG. 1B is a diagram illustrating an NCT carrier configuration.
Figure 1A:
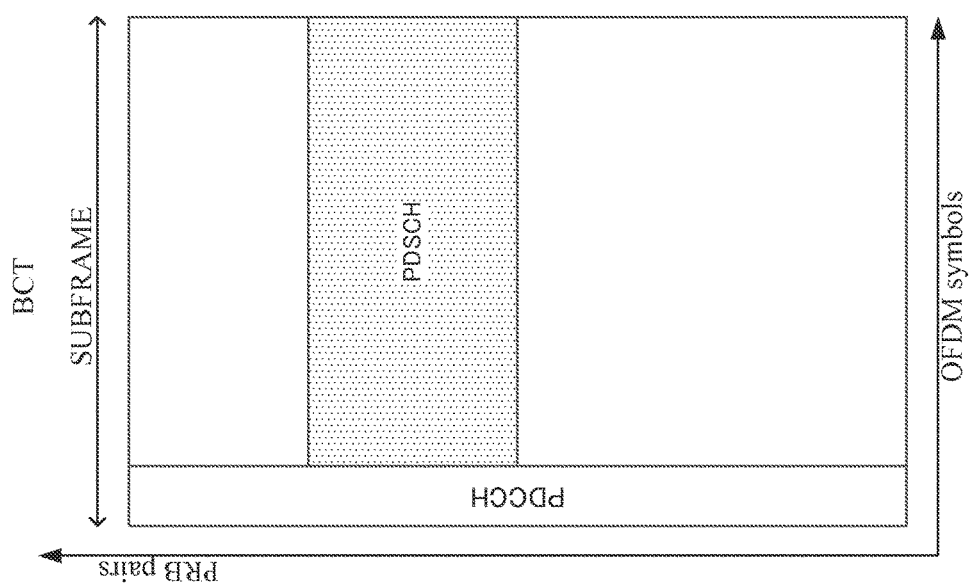
FIG. 1A is a diagram illustrating a BCT carrier configuration.

Hereinafter, each embodiment of the present invention will be described in detail with reference to the accompanying drawings. In describing the embodiments, the same configuration elements are assigned the same reference numerals, and redundant descriptions of the configuration elements will be omitted.

Embodiment 1

[Configuration of Communication System]
A communication system according to Embodiment 1 is an LTE-Advanced system, for example, and includes base station 100 and terminal 200. Base station 100 is a small cell supporting the LTE-Advanced system, for example. Terminal 200 is a terminal supporting the LTE-Advanced system and is connected only to base station 100 (small cell). Specifically, base station 100 and terminal 200 use S-NCT (hereinafter, may be referred to as "NCT," simply).

Base station 100 maps an EPDCCH-CSS in NCT and transmits DCIs on the system information, paging and RACH, using the EPDCCH-CSS. In this transmission, base station 100 indicates, to terminal 200, resource allocation information for identifying the start position of and the number of RBs to which the EPDCCH-CSS is mapped, by an NCT-MIB (MIB mapped in NCT). The RB to which the NCT-MIB is mapped may be configured to be shared by all the cells as in BCT or may be determined on the basis of the cell ID of the small cell (base station 100). In addition, the NCT-MIB is subjected to scrambling processing on the basis of the cell ID of the small cell.

In addition, studies have been carried out on using, as a detection signal (discovery signal) or synchronization signal, PSS/SSS, CRS, CSI-RS, PRS, or a signal to be newly designed, in NCT, while a PSS/SSS is used in detection and synchronization with a cell by terminals in BCT. In NCT, whether or not to perform only cell detection under the assumption that the terminal has already been in synchronization with the base station, or to perform not only cell detection but also synchronization with the cell depends on the design of cell. In this embodiment, however, no particular distinction is made between the detection signal (discovery signal) and synchronization signal, and the two signals are combined together and called a "discovery signal."

Embodiment 1 will be described regarding a case where the cell ID can be identified by a discovery signal in terminal 200. However, the cell ID may be previously indicated to terminal 200 by a neighboring cell or the like. Terminal 200 demodulates the NCT-MIB using a DMRS of the RB to which the NCT-MIB is mapped, or the cell ID indicated by the discovery signal.

[Primary Configuration Part of Base Station 100]

Figure 2:
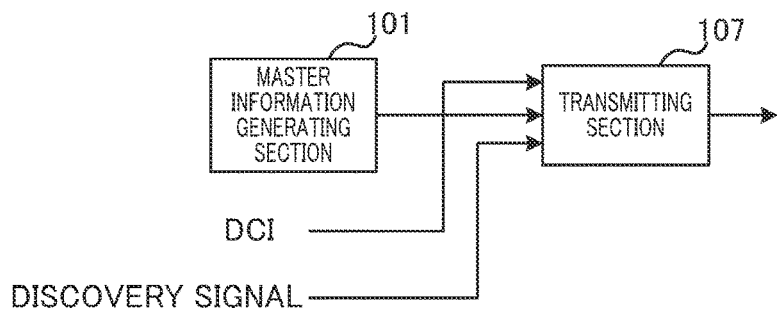
FIG. 2 is a block diagram illustrating a primary configuration part of a base station according to Embodiment 1 of the present invention.

FIG. 2 is a block diagram indicating a primary configuration part of base station 100 according to Embodiment 1. Base station 100 uses a carrier configuration (NCT) which includes no PDCCH region for mapping a PDCCH and in which an EPDCCH is mapped in a data region. In base station 100, master information generating section 101 generates allocation information which indicates the resources forming a search space (EPDCCH CSS) in an EPDCCH and which is scrambled with the cell ID of base station 100. Signal assignment section 106 assigns the allocation information and the discovery signal indicating the cell ID to the corresponding resources and assigns a control signal (DCI) in the search space. In this manner, the allocation information, the discovery signal indicating the cell ID and the control signal (DCI) that has been assigned in the search space are transmitted.

[Primary Configuration Part of Terminal 200]

Figure 3:
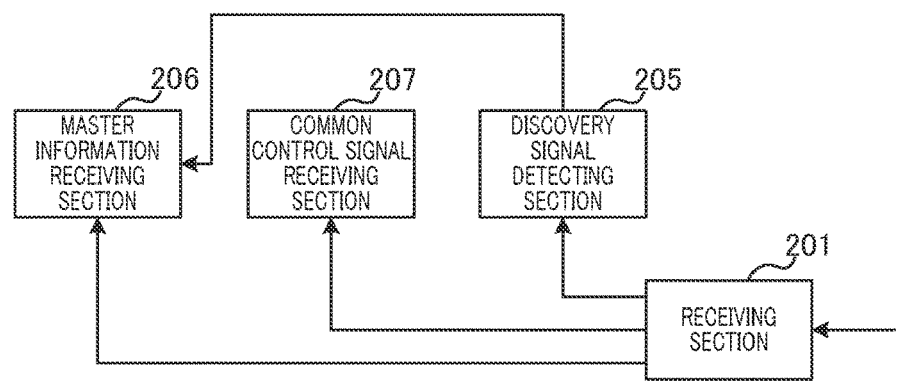
FIG. 3 is a block diagram illustrating a primary configuration part of a terminal according to Embodiment 1 of the present invention.

FIG. 3 is a block diagram illustrating a primary configuration part of terminal 200 according to Embodiment 1. In terminal 200, signal demultiplexing section 202 receives a received signal transmitted from base station 100 that uses a carrier configuration (NCT) which includes no region for mapping a PDCCH and in which an EPDCCH is mapped in a data region. Discovery signal detecting section 205 detects a discovery signal indicating the cell ID of base station 100 from the received signal. Master information receiving section 206 extracts the allocation information indicating the resources forming a search space in the EPDCCH from the received signal using the abovementioned cell ID. Common control signal receiving section 207 extracts a control signal (DCI) from the received signal by performing blind-decoding with respect to the search space.

[Configuration of Base Station 100]

Figure 4:
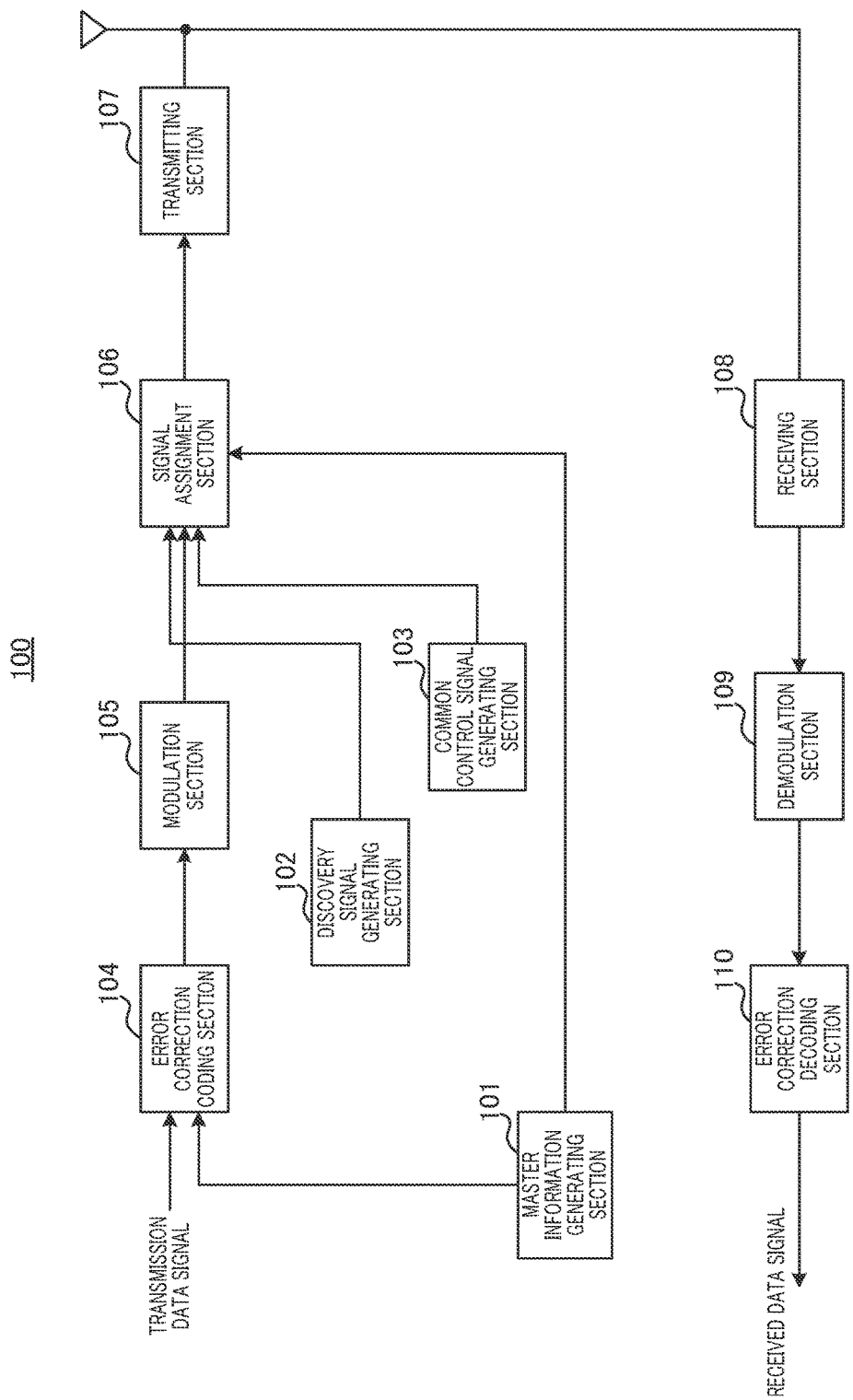
FIG. 4 is a block diagram illustrating a configuration of the base station according to Embodiment 1 of the present invention.

FIG. 4 is a block diagram illustrating a configuration of base station 100 according to Embodiment 1 of the present invention.

Referring to FIG. 4, base station 100 includes master information generating section 101, discovery signal generating section 102, common control signal generating section 103, error correction coding section 104, modulation section 105, signal assignment section 106, transmitting section 107, receiving section 108, demodulating section 109, and error correction decoding section 110.

Master information generating section 101 generates control information to be transmitted as an MIB (NCT-MIB) to be mapped in NCT. Master information generating section 101 outputs the generated NCT-MIB to error correction coding section 104 and signal assignment section 106. The NCT-MIB contains the resource allocation information indicating the resources forming an EPDCCH CSS. For example, when type 2 distributed allocation (may be referred to as "type 2 distributed VRB allocation") for allocation from a virtual resource block (VRB) to a physical resource block (PRB) is used as resource allocation for EPDCCH CSS, the resource allocation information for EPDCCH CSS is information for identifying the start position of and the number of contiguous RBs to which the EPDCCH CSS is mapped. In addition, each bandwidth is configured with different values each serving as a candidate for the number of RBs to which an EPDCCH CSS is mapped. In addition, the number of RBs to which the EPDCCH CSS is mapped can be selected from among the candidates. For example, the larger the bandwidth is, the larger the number of RBs to which an EPDCCH CSS is mapped is. In addition, the NCT-MIB is subjected to scrambling processing based on the cell ID of base station 100.

Discovery signal generating section 102 generates a discovery signal based on the cell ID of base station 100 and outputs the generated discovery signal to signal assignment section 106.

Common control signal generating section 103 generates DCIs (common control signals) to be transmitted using an EPDCCH CSS and outputs the generated DCIs to signal assignment section 106. The DCIs are control signals on the system information, paging, RACH, and transmission power control and are masked with SI-RNTI, P-RNTI, RA-RNTI, and TPC-RNTI, respectively.

Error correction coding section 104 performs error correction coding on transmission data signal (i.e., downlink data), and the control information received from master information generating section 101 and outputs the coded signal to modulation section 105.

Modulation section 105 modulates the signal received from error correction coding section 104 and outputs the modulation signal to signal assignment section 106.

Signal assignment section 106 assigns the common control signal received from common control signal generating section 103 to a resource in the EPDCCH CSS on the basis of the control information received from master information generating section 101. Specifically, signal assignment section 106 identifies the RBs forming the EPDCCH CSS indicated by the control information received from master information generating section 101 and thereby assigns the common control signal to any of the identified RBs. In addition, signal assignment section 106 assigns the modulation signal received from modulation section 105 to a pre-configured downlink resource. Signal assignment section 106 also assigns the discovery signal received from discovery signal generating section 102 to a downlink resource based on the cell ID.

As described above, a transmission signal is generated by assigning the signal including the downlink data and control information (NCT-MIB), a discovery signal, or the common control signal assigned in the EPDCCH CSS to a predetermined resource. The generated transmission signal is outputted to transmitting section 107.

Transmitting section 107 performs predetermined transmission processing such as up-conversion on the transmission signal received from signal assignment section 106 and transmits the processed signal to terminal 200 via an antenna.

Receiving section 108 receives, via an antenna, a signal transmitted from terminal 200 and performs predetermined reception processing such as down-conversion on the received signal. Receiving section 108 outputs the processed signal to demodulation section 109.

Demodulation section 109 performs demodulation processing on the signal received from receiving section 108 and outputs the obtained demodulation signal to error correction decoding section 110.

Error correction decoding section 110 decodes the demodulation signal received from demodulation section 109 to acquire the received data signal (i.e., uplink data).

[Configuration of Terminal 200]

Figure 5:
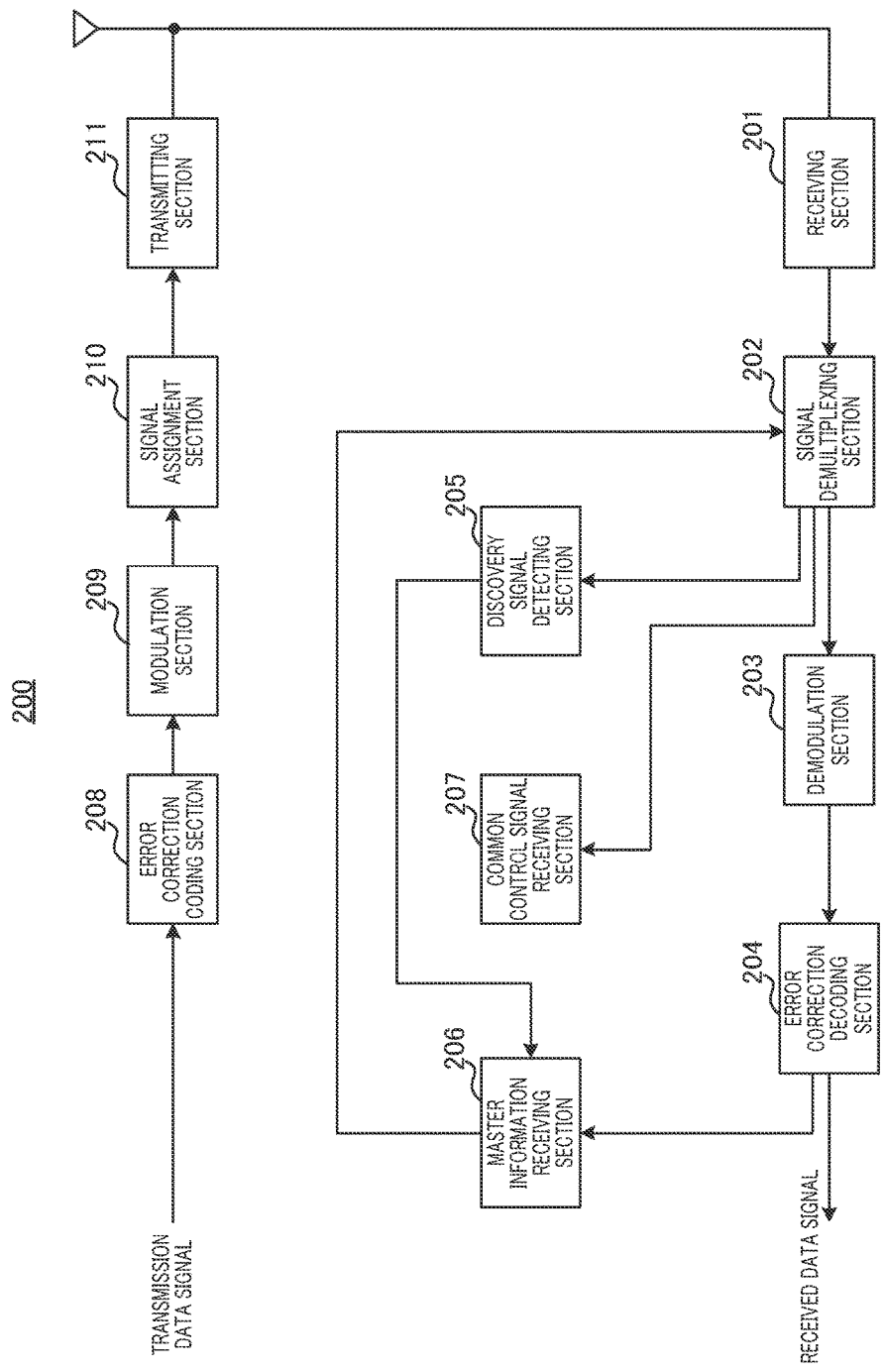
FIG. 5 is a block diagram illustrating a configuration of the terminal according to Embodiment 1 of the present invention.

FIG. 5 is a block diagram illustrating a configuration of terminal 200 according to the present embodiment.

Referring to FIG. 5, terminal 200 includes receiving section 201, signal demultiplexing section 202, demodulation section 203, error correction decoding section 204, discovery signal detecting section 205, master information receiving section 206, common control signal receiving section 207, error correction coding section 208, modulation section 209, signal assignment section 210, and transmitting section 211.

Receiving section 201 receives, via an antenna, a signal transmitted from base station 100, then performs predetermined reception processing such as down-conversion on the received signal and outputs the processed signal to signal demultiplexing section 202. Note that, the received signal includes a signal including downlink data and control information (NCT-MIB), a discovery signal, or a common control signal, for example.

Signal demultiplexing section 202 extracts a signal corresponding to a data resource (downlink data and control information) from the received signal and outputs the extracted signal to demodulation section 203. In addition, signal demultiplexing section 202 demultiplexes a resource that may include a discovery signal from the received signal and outputs the components of the demultiplexed resource to discovery signal detecting section 205. Moreover, signal demultiplexing section 202 demultiplexes an EPDCCH CSS resource from the received signal received from receiving section 201, on the basis of resource allocation information for EPDCCH CSS received from master information receiving section 206 to be described hereinafter, and outputs the components of the demultiplexed resource to common control signal receiving section 207.

Demodulation section 203 demodulates the signal received from signal demultiplexing section 202 and outputs the demodulated signal to error correction decoding section 204.

Error correction decoding section 204 decodes the demodulation signal received from demodulation section 203 and outputs the acquired received data signal. In addition, error correction decoding section 204 outputs the acquired NCT-MIB to master information receiving section 206.

Discovery signal detecting section 205 detects a discovery signal indicating the cell ID of base station 100 from the received signal. Specifically, discovery signal detecting section 205 detects whether or not a discovery signal is transmitted, using the signal received from signal demultiplexing section 202. When a discovery signal is transmitted, discovery signal detecting section 205 identifies the cell ID by using the detected discovery signal. Discovery signal detecting section 205 outputs the identified cell ID to master information receiving section 206.

Master information receiving section 206 extracts the resource allocation information indicating the resources forming the EPDCCH CSS from the received signal, using the cell ID of base station 100. Specifically, master information receiving section 206 demodulates an NCT-MIB (NCT-MIB scrambled with cell ID) received from error correction decoding section 204, using the cell ID received from discovery signal detecting section 205, and extracts the resource allocation information for EPDCCH CSS. Master information receiving section 206 outputs the resource allocation information for EPDCCH CSS to signal demultiplexing section 202.

Common control signal receiving section 207 extracts a common control signal (DCI) from the received signal by performing blind-decoding with respect to the EPDCCH CSS. Specifically, common control signal receiving section 207 performs blind-decoding (i.e., monitoring) on the resources of the EPDCCH CSS received from signal demultiplexing section 202 and extracts a common control signal (DCI). Note that, each DCI is masked with SI-RNTI, P-RNTI, RA-RNTI, or TPC-RNTI.

Error correction coding section 208 performs error correction coding on a transmission data signal (uplink data) and outputs the coded signal to modulation section 209.

Modulation section 209 modulates the signal outputted from error correction coding section 208 and outputs the modulation signal to signal assignment section 210.

Signal assignment section 210 assigns the signal received from modulation section 209 to an uplink resource. The assigned signal is outputted to transmitting section 211 as a transmission signal.

Transmitting section 211 performs predetermined transmission processing such as up-conversion on the transmission signal received from signal assignment section 210 and transmits the processed signal via an antenna.

[Operations of Base Station 100 and Terminal 200]

The operations of base station 100 and terminal 200 each configured in the manner described above will be described in detail.

First of all, type 2 distributed allocation in LTE-Advanced will be described.

In type 2 distributed allocation, the mapping rule from VRBs to PRBs is defined in such a way that VRBs are allocated contiguously and that PRBs are distributedly allocated during mapping from VRBs to PRBs. The starting number of and the number of contiguously allocated VRBs are specified as resource allocation information. As a result, the number of bits required to indicate resource allocation can be kept small while the frequency diversity effect can be obtained in the meantime. Furthermore, in type 2 distributed allocation in LTE-Advanced, a mapping rule to be used varies between the first and second slots forming one subframe, in order that VRBs mapped to PRBs vary between the first and second slots. As a result, the frequency diversity effect is further obtained. In addition, when DCI format 1C is used to indicate resource allocation, the numbers that can be specified as the starting number of VRBs are limited in order to further reduce the number of bits required to indicate resource allocation. Specifically, the starting number of VRBs is selectable from 0, step, 2*step, 3*step, . . . . Note that the value of step varies for each bandwidth. For example, step=2 when the number of RBs of the bandwidth is less than 50, and step=4 when the number of RBs of the bandwidth is 50 or greater.

Next, a method of indicating resource allocation information for EPDCCH CSS according to the present embodiment will be described.

In Embodiment 1, a method based on the type 2 distributed allocation described above is used for indicating the resource allocation for EPDCCH CSS. Specifically, base station 100 indicates, to terminal 200, resource allocation information for identifying the starting number (start position) of and the number of contiguous VRBs to which an EPDCCH CSS is mapped. During this process, base station 100 indicates to terminal 200, using an NCT-MIB, the starting number (start position) of and the number of contiguous VRBs for identifying the EPDCCH CSS.

In the current MIB specification, the following are configured: downlink bandwidth (dl Bandwidth), PHICH mapping information (phich Config. (3 bits)), the frame number used to transmit an MIB (systemFrame Number (8 bits)), and a spare region for a functional expansion (spare. (10 bits)).

```
MasterInformationBlock :: =SEQUENCE {
    dl Bandwidth ENUMERATED {
                     n6, n15, n25, n50, n75, n100},
    phich Config          PHICH Config,
    systemFrameNumber     BIT STRING (SIZE(8)),
    spare                 BIT STRING (SIZE(10))
}
```

Meanwhile, it is likely that no PHICH is used in NCT because NCT includes no region in which a PDCCH is mapped, (see FIG. 1B). As a result, a phich Config (and spare) region is can be used for indicating other information in an NCT-MIB according to the current MIB specification.

Accordingly, base station 100 indicates, to terminal 200, resource allocation information indicating the starting number of and the number of VRBs forming an EPDCCH CSS, using an NCT-MIB (e.g., phich Config and spare regions) in this embodiment. This NCT-MIB is scrambled with the cell ID of base station 100.

After acquisition of the cell ID of base station 100 by using a discovery signal, terminal 200 receives the NCT-MIB and thereby identifies the starting number of and the number of VRBs forming the EPDCCH CSS. In this manner, terminal 200 (e.g., idle mode UE) can recognize base station 100 (e.g., small cell using S-NCT), then acquire the resources (RB start position and the number of RBs) to which the EPDCCH CSS is mapped, and thus receive DCIs assigned in the EPDCCH CSS, without using a UE-specific control signal.

Regarding the resources of EPDCCH CSS to be indicated by using an NCT-MIB, in Embodiment 1, the starting number of VRBs forming the EPDCCH CSS is configured in the same method as the above described method used in LTE-Advanced, for example. Specifically, the starting number of VRBs is selected from among 0, step, 2*step, 3*step, . . . .

Meanwhile, the number of VRBs forming an EPDCCH CSS is configured by using a method different from the above described method used in LTE-Advanced. Specifically, a larger number of VRBs (the number of PRBs) to which an EPDCCH CSS is mapped is configured for a larger downlink bandwidth.

Setting a larger number of resources forming an EPDCCH CSS results in a decrease in the number of resources allocatable to a physical downlink shared channel (i.e., data region, "PDSCH") although the frequency diversity effect improves in this case. A smaller number of resources allocatable to a PDSCH results in degradation of the downlink throughput. With this taken into consideration, however, the adverse effect of degradation of the downlink throughput due to the limitation on the PDSCH is expected to be small in case of a larger bandwidth, while the effect of improvement in the throughput because of the quality improvement in the EPDCCH attributable to an increase in the number of resources for the EPDCCH CSS is expected to be large. Thus, it is effective to change the number of resources forming an EPDCCH CSS in accordance with the bandwidth.

However, the number of resources (RBs) required to satisfy the quality of EPDCCH CSS varies depending on the cell radius of the small cell or interference or the like from a different cell. With this taken into consideration, a plurality of candidates for the number of RBs may be associated with each bandwidth in this embodiment. FIG. 6 illustrates an example of a correspondence between the number of RBs (N_RB) corresponding to the frequency bandwidth ([MHz]) and the number of RBs of EPDCCH CSS. As illustrated in FIG. 6, the larger the frequency bandwidth (the larger the number of N_RB) is, the larger the number of RBs of EPDCCH CSS is configured. In addition, as illustrated in FIG. 6, two candidates for the number of RBs of EPDCCH CSS are associated with each of the frequency bandwidths. In this case, base station 100 may indicate, using one bit of an NCT-MIB (e.g., phich Config or spare), the information indicating which one of the plurality of candidates for the number of RBs as illustrated in FIG. 6 is used, as the resource allocation information.

FIG. 7 illustrates a mapping example of an EPDCCH CSS. FIG. 7 illustrates a mapping rule from VRBs to PRBs when the number of RBs of the entire band is 25. Specifically, as illustrated in FIG. 7, VRB #0 to #23 in ascending order are associated with PRB #0 to #23 in an interleaved order.

When the number of RBs of the entire band is 25 (N_RB=25), any one of 2 and 4 is configured as the number of RBs of EPDCCH CSS with reference to FIG. 6, for example. Let us consider a case where 4 is selected as the number of RBs of EPDCCH CSS, and the start position of the VRBs to which the EPDCCH CSS is mapped is VRB #8, for example. In this case, as illustrated in FIG. 7, the EPDCCH CSS is mapped to VRB #8, 9, 10, and 11 in VRBs and PRB #9, 13, 17, and 21 in PRBs.

More specifically, in FIG. 7, base station 100 sets VRB #8 as the start position and transmits, to terminal 200, an NCT-MIB containing resource allocation information for the EPDCCH CSS consisting of 4 RBs, a discovery signal indicating the cell ID used for the process of scrambling the NCT-MIB, and a common control signal (DCI) assigned to a resource of the EPDCCH CSS consisting of PRB #9, 13, 17, and 21 (VRB #8, 9, 10, and 11). Terminal 200 extracts the NCT-MIB using the cell ID indicated by the discovery signal, then identifies the EPDCCH CSS consisting of PRB #9, 13, 17, and 21 (VRB #8, 9, 10, and 11) on the basis of the resource allocation information contained in the NCT-MIB, and then receives the common control signal (DCI) by performing blind-decoding with respect to the EPDCCH CSS.

In Embodiment 1, in base station 100 (small cell) configured to use a carrier configuration which includes no PDCCH region and in which an EPDCCH is mapped in a data region, master information generating section 101 generates resource allocation information indicating the resources forming an EPDCCH CSS and being scrambled with the cell ID of base station 100 (i.e., NCT-MIB); and transmitting section 107 transmits the above described resource allocation information, a discovery signal indicating the cell ID, and a common control signal (DCI) assigned in the EPDCCH CSS, in the manner described above. Meanwhile, in terminal 200, discovery signal detecting section 205 detects a discovery signal from the received signal that has been transmitted from base station 100; and master information receiving section 206 extracts the resource allocation information indicating the resources forming the EPDCCH CSS from the received signal by using the cell ID; and common control signal receiving section 207 extracts a common control signal (DCI) from the received signal by performing blind-decoding with respect to the EPDCCH CSS.

Stated differently, according to the present invention, an idle mode UE (terminal 200) receives an NCT-MIB based on the cell ID identified by detecting the discovery signal and thus can receive a DCI in the EPDCCH CSS identified on the basis of resource allocation information contained in the NCT-MIB. Specifically, according to the present embodiment, terminal 200 can recognize an EPDCCH CSS without a UE-specific control signal and acquire a DCI assigned in the EPDCCH CSS. As a result, even in a small cell using S-NCT, an idle mode UE can recognize the small cell and thereby receive DCIs on the system information, paging, and RACH as in BCT.

Moreover, according to the present embodiment, a larger number of RBs of EPDCCH CSS is configured for a larger frequency bandwidth (larger number of RBs of band). As a result, in case of a larger frequency bandwidth, the effect of improvement in the throughput because of the quality improvement in the EPDCCH can be obtained while the adverse effect of degradation of the downlink throughput due to the limitation on a PDSCH is kept small.

Note that, in this embodiment, the number of "steps" each used to specify the start position of VRBs forming an EPDCCH CSS may be configured to have the same value as the number of sets of RBs of EPDCCH CSS. With this configuration, it is possible to secure the number of candidates for mapping an EPDCCH CSS for the number of sets of RBs that enable mapping of an EPDCCH CSS without any overlapping between RBs in the entire band.

Furthermore, although a mapping rule to be used varies between the first and second slots in type 2 distributed allocation in LTE-Advanced, the same mapping rule may be used in the first and second slots in Embodiment 1. With this configuration, an EPDCCH CSS is mapped to the same PRBs in the slots. This configuration is advantageous because since a DMRS is used to demodulate an EPDCCH, it is better to map an EPDCCH CSS to the same PRBs in the first and second slots in order for the EPDCCH to be demodulated by using both DMRSes in the first and second slots. In addition, using the same PRB number for mapping an EPDCCH CSS in the first and second slots can reduce the number of RBs that cannot be used for PDSCH. In addition, although Embodiment 1 has been described regarding a case where the rule (see FIG. 7) in the first slot is applied as a mapping rule from VRBs to PRBs, a rule in the second slot may be used.

In addition, in this embodiment, the period of CSS, which indicates how often an EPDCCH CSS is transmitted, may be added as the resource allocation information indicated by using an NCT-MIB. For example, it is possible to allow the subframe period of mapping an EPDCCH CSS to be selected from among four types of subframe periods (5 msec, 10 msec, 20 msec, and 40 msec), using two bits of the NCT-MIB. With this configuration, the overhead amount of EPDCCH CSS is made adjustable in accordance with the downlink traffic volume. Moreover, indicating a subframe in which no EPDCCH CSS is mapped can reduce misdetection and false detection of EPDCCH in terminal 200.

(Variation 1)

Although Embodiment 1 has been described regarding a case where the number of RBs used for an EPDCCH CSS is changed for each frequency bandwidth (the number of RBs) (see FIG. 6), the number of EPDCCHs to be monitored by terminal 200 may be changed for each number of RBs used for EPDCCH and for each aggregation level (AL) to be described, hereinafter.

In LTE-Advanced, one RB consists of 12 subcarriers in the frequency domain and has a width of 0.5 msec in the time domain. Two RBs combined in the time domain are referred to as an RB pair as a unit. Specifically, an RB pair consists of 12 subcarriers in the frequency domain and has a width of 1 msec in the time domain. Meanwhile, when an RB pair represents a group of 12 subcarriers in the frequency domain, the RB pair may be simply called "RB." Moreover, in the physical layer, an RB pair is called a physical RB (PRB) pair. In addition, a unit defined by one subcarrier and one OFDM symbol is called a resource element (RE).

In an EPDCCH, resource units each called "enhanced resource element group (EREG)" are formed by dividing each PRB pair into 16 resources, and a resource unit consists of 4 or 8 EREGs is called "enhanced control channel element (ECCE)." In addition, the number of ECCEs forming an EPDCCH transmitting one control signal is called "aggregation level." An EPDCCH has a plurality of aggregation levels. Each aggregation level has pre-defined EPDCCH candidates. The term "EPDCCH candidate" refers to a candidate for a region to which a control signal is assigned, and a search space consists of a plurality of EPDCCH candidates. For example, the number of PDCCH candidates for a PDCCH CSS is 4 in aggregation level 4 (AL4) and 2 in aggregation level 8 (AL8).

For example, when one ECCE consists of 4 EREGs in an EPDCCH, the number of ECCEs is 32 for 8 RBs (i.e., the number of PRB pairs) and the number of ECCEs is 16 for 4 RBs. Moreover, the number of ECCEs is 8 for 2 RBs and the number of ECCEs is 4 for 1 RB in this case. Accordingly, when the number of EPDCCH candidates for EPDCCH CSS is 4 in AL4 and 2 in AL8 as in the case of PDCCH CSS, ECCEs forming each EPDCCH candidate overlap.

For this reason, the AL of EPDCCH CSS may be changed for each number of RBs forming the EPDCCH CSS in order to avoid overlapping of EPDCCH candidates for the EPDCCH CSS. For example, FIG. 8 illustrates a correspondence between the number of RBs used for EPDCCH CSS, the aggregation level (AL) and the number of EPDCCHs to be monitored by terminal 200. Note that, FIG. 8 illustrates a case where one ECCE consists of 4 EREGs in an EPDCCH.

As illustrated in FIG. 8, the number of EPDCCH candidates for EPDCCH CSS is configured to be 3 for AL1, 2 for AL2, and 1 for AL4 when the number of RBs for EPDCCH CSS is 1 (the number of ECCEs: 4). The number of EPDCCH candidates for EPDCCH CSS is configured to be 3 for AL2, 2 for AL4, and 1 for AL8 when the number of RBs for EPDCCH CSS is 2 (the number of ECCEs: 8) in FIG. 8. In addition, when the number of RBs for EPDCCH CSS is 4 (the number of ECCEs: 16), the number of EPDCCH candidates for EPDCCH CSS is configured to be 4 for AL4, and 2 for AL8 in FIG. 8. When the number of RBs for EPDCCH CSS is 8 (the number of ECCEs: 32), the number of EPDCCH candidates for EPDCCH CSS is configured to be 3 for AL4, 2 for AL8, and 1 for AL16 in FIG. 8.

With this configuration, EPDCCH candidates in each aggregation level can be configured without overlapping of ECCEs.

(Variation 2)

Embodiment 1 has been described regarding a case where the start position of VRBs for EPDCCH CSS is indicated by an NCT-MIB. However, in Variation 2, the start position of VRBs for EPDCCH CSS is specified on the basis of the cell ID. In this case, the resource allocation information contained in the NCT-MIB becomes information that indicates only the number of VRBs forming the EPDCCH CSS. With this configuration, the number of bits required to indicate the resource allocation for EPDCCH CSS can be further reduced compared with the present embodiment described above. In this configuration, the cell ID is acquired from a discovery signal in terminal 200, for example. The term "cell ID" is also referred to as "physical cell ID (PCID)."

The start position of RBs (RB_start) based on the cell ID is calculated in accordance with equation 1 below, for example.

[1]

$$RB\_start = (PCID \bmod \text{floor}(N\_VRB/K)) * K \quad \text{(Equation 1)}$$

In equation 1, K represents the number of RBs allocated to the EPDCCH CSS, and N_VRB represents the number of VRBs in total. For example, where PCID=1500, K=4, and N_VRB=24, RB_start=(1500 mod floor 24/4)*4=0. As a result, the EPDCCH CSS is assigned to VRB #0, 1, 2, and 3 in VRBs and PRB #0, 4, 8, and 12 in PRBs (see FIG. 9, for example).

However, if the start position of RBs for EPDCCH CSS overlaps between neighboring cells, interference occurs between the cells. In order to avoid such interference between the neighboring cells, a shift value may be configured in this case. For example, setting an integral multiple of K as the shift value makes it possible to avoid overlapping of EPDCCH CSS between neighboring cells in all RBs. Regarding the shifting of RB start position, one shift value may be pre-defined, and the presence or absence of shifting of the start position of RBs may be indicated by using one bit. In addition, it is also possible to use two or more bits to allow the shift value to be selected from among a plurality of shift values.

Note that, since K is used to represent the number of RBs allocated to an EPDCCH CSS in equation 1, the number of candidates for the number of sets that enable mapping without any overlapping between EPDCCH CSSes can be secured in the entire band. When overlapping is allowed, K may be used to represent half of the number of RBs allocated to an EPDCCH CSS.

Embodiment 2

In Embodiment 2, a method of avoiding a collision between a discovery signal (or synchronization signal) and an EPDCCH CSS will be described.

In Embodiment 2, it is assumed that a discovery signal is mapped to a specific resource element (RE) in a subframe and also that UEs are made aware of the mapping position of the discovery signal in advance.

[Configuration of Base Station 300]

Figure 10:
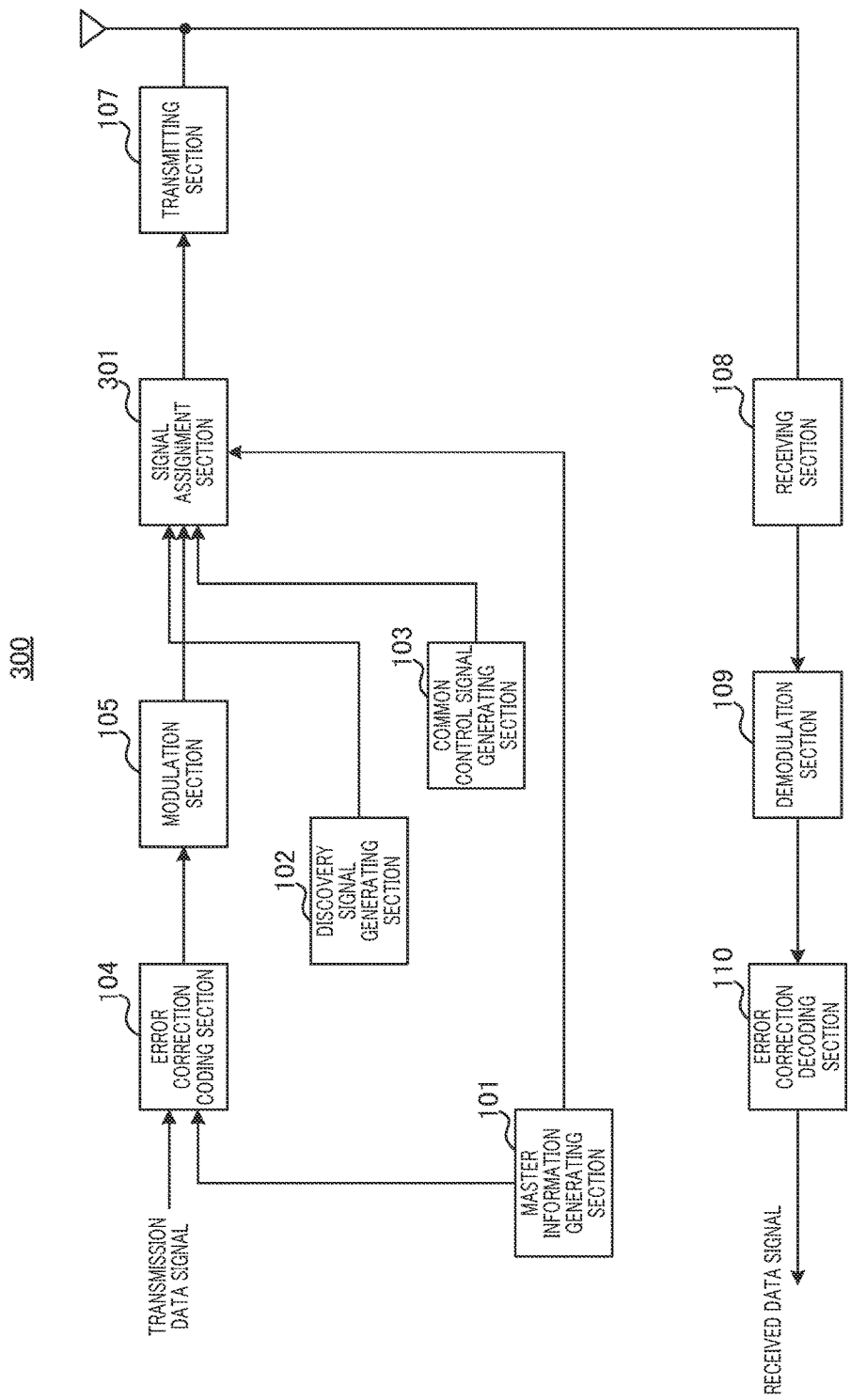
FIG. 10 is a block diagram illustrating a configuration of a base station according to Embodiment 2 of the present invention.

FIG. 10 is a block diagram illustrating a configuration of base station 300 according to Embodiment 2 of the present invention. In FIG. 10, the same components as those illustrated in Embodiment 1 (FIG. 4) are assigned the same reference numerals and redundant descriptions of the components will be omitted hereinafter.

In FIG. 10, as in Embodiment 1 (signal assignment section 106), signal assignment section 301 assigns a modulation signal received from modulation section 105, a common control signal received from common control signal generating section 103, and a discovery signal received from discovery signal generating section 102 to corresponding resources, respectively. During the assignment, when a resource to which an EPDCCH CSS is mapped and a resource to which the discovery signal is mapped collide with each other, signal assignment section 301 changes the resource to which the EPDCCH CSS is mapped. Note that, the method of changing a mapping resource for EPDCCH CSS will be described, hereinafter.

[Configuration of Terminal 400]

Figure 11:
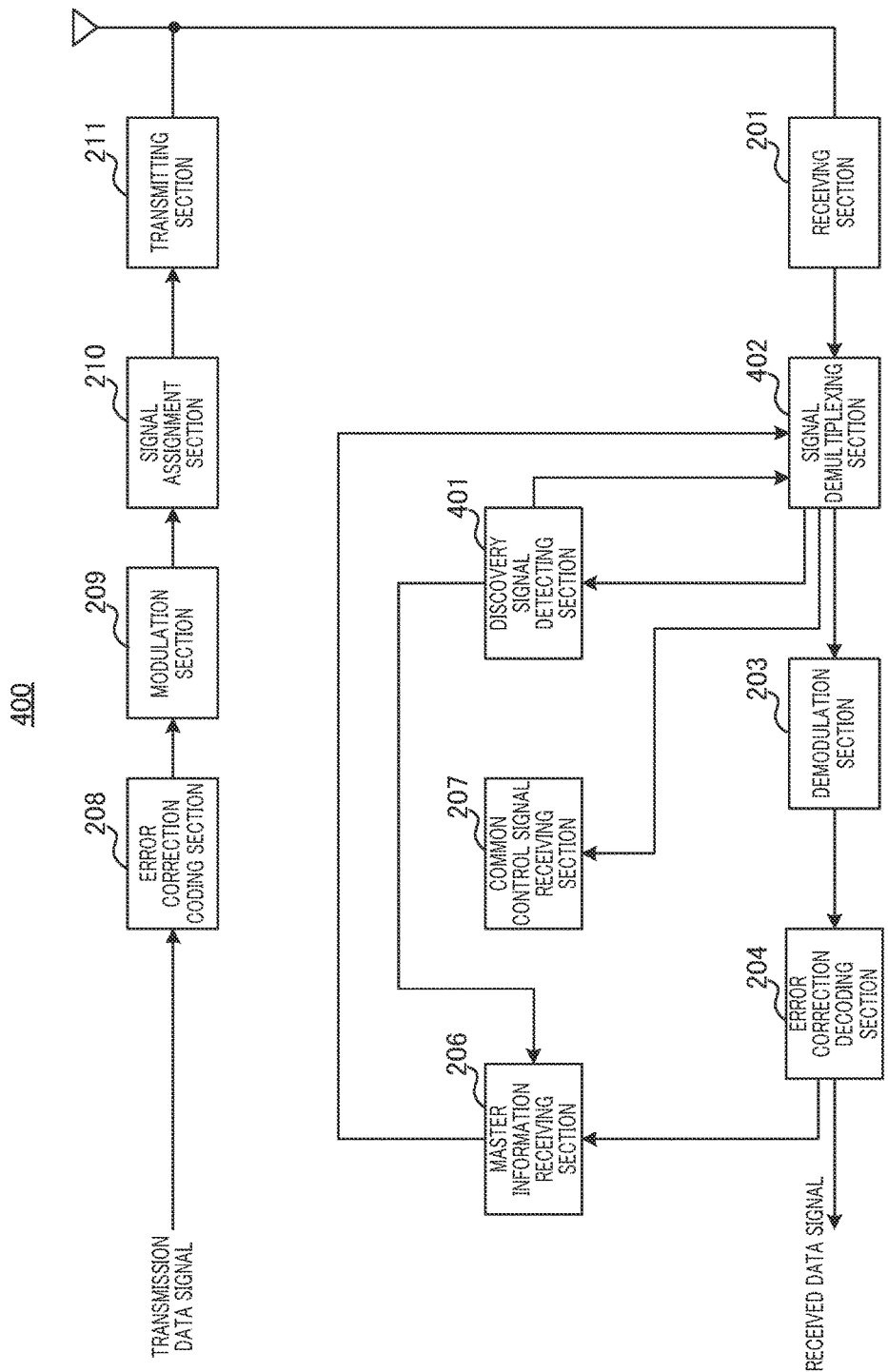
FIG. 11 is a block diagram illustrating a configuration of a terminal according to Embodiment 2 of the present invention.

FIG. 11 is a block diagram illustrating a configuration of terminal 400 according to Embodiment 2 of the present invention. Note that, in FIG. 11, the same components as those illustrated in Embodiment 1 (FIG. 5) are assigned the same reference numerals, and redundant descriptions of the components are omitted, hereinafter.

Referring to FIG. 11, discovery signal detecting section 401 performs the operations described in Embodiment 1 (i.e., discovery signal detecting section 205) and also outputs the transmission period of a discovery signal, and resource information (e.g., mapping position) to signal demultiplexing section 402.

As in Embodiment 1 (signal demultiplexing section 202), signal demultiplexing section 402 demultiplexes, from the received signal, a signal corresponding to a data resource (i.e., downlink data and control information), a resource that may include a discovery signal, and a resource for EPDCCH CSS. During this processing, signal demultiplexing section 402 recognizes a resource that may involve a collision between a resource to which a discovery signal is mapped and a resource to which an EPDCCH CSS is mapped, on the basis of the transmission period of a discovery signal, and the resource information received from discovery signal detecting section 401 and the resource allocation information for the EPDCCH CSS received from master information receiving section 206. Signal demultiplexing section 402 recognizes that there has been a change in resources to which the EPDCCH CSS is mapped, for a resource that may involve a collision, and thus demultiplexes the components of the resources for EPDCCH CSS from the received signal. Note that, the method of changing a mapping resource for EPDCCH CSS will be described, hereinafter.

[Operations of Base Station 300 and Terminal 400]

The operations of base station 300 and terminal 400 each configured in the manner described above will be described in detail.

Operation Examples 1 to 3 will be described with respect to the method of changing a mapping resource for EPDCCH CSS in base station 300 and terminal 400.

Operation Example 1

In Operation Example 1, when a pattern in which a discovery signal and EPDCCH CSS are mapped in the same subframe is used, no EPDCCH CSS is mapped in this subframe. Specifically, a collision between a discovery signal and EPDCCH CSS is avoided on a per-subframe basis in Operation Example 1.

Figure 12:
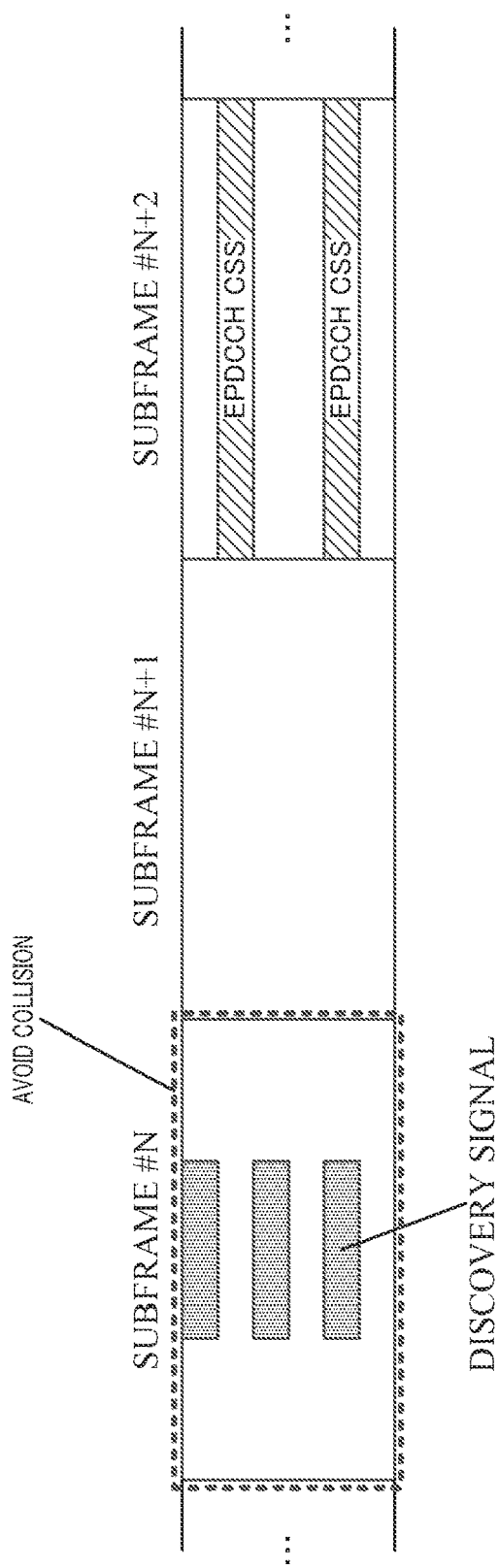
FIG. 12 is a diagram illustrating an EPDCCH CSS mapping method in each subframe according to Embodiment 2 of the present invention (Operation Example 1)

For example, as illustrated in FIG. 12, it is assumed that the transmission interval of a discovery signal is 5 msec (e.g., subframe #N−10, #N−5, #N, #N+5, #N+10), and that the transmission interval of an EPDCCH CSS is 2 msec (e.g., subframe #N−4, #N−2, #N, #N+2, #N+4). In this case, transmission timing at which a discovery signal and EPDCCH CSS are mapped in the same subframe and thus collide with each other corresponds to the interval of 10 msec (e.g., subframe #N−20, #N−10, #N, #N+10, #N+20).

In this operation, terminal 400 detects a discovery signal, then receives an MIB using the discovery signal, and identifies the EPDCCH CSS. For this reason, it is favorable for terminal 400 to receive a discovery signal preferentially over an EPDCCH CSS.

In this respect, base station 300 (signal assignment section 301) maps no EPDCCH CSS (i.e., transmits no EPDCCH CSS) in subframes transmitted at the intervals of 10 msec, which correspond to the transmission timing of a discovery signal (e.g., subframe #N in FIG. 12) among the subframes corresponding to the transmission timing of EPDCCH CSS. Likewise, terminal 400 (signal demultiplexing section 402) skips the process of detecting an EPDCCH CSS in subframes transmitted at the intervals of 10 msec, which correspond to the transmission timing of a discovery signal (e.g., subframe #N in FIG. 12) among the subframes corresponding to the transmission timing of EPDCCH CSS. Terminal 400 (signal demultiplexing section 402) in this case does not perform the output processing to common control signal receiving section 208 in this case.

With this configuration, no EPDCCH CSS is mapped in a subframe in which a discovery signal is mapped among a plurality of subframes each pre-configured as a subframe in which an EPDCCH CSS is to be mapped. As a result, performing the transmission and reception of a discovery signal preferentially over the transmission and reception of an EPDCCH CSS makes it possible to keep the detection accuracy of cells. In addition, avoiding simultaneous transmission of a discovery signal and EPDCCH CSS makes it possible to keep the quality of EPDCCH CSS, so that the probability of false detection and misdetection of an EPDCCH CSS can be kept low.

Note that, when the transmission interval of EPDCCH CSS is variable, the transmission interval of EPDCCH CSS may be determined taking into consideration the resource amount required for EPDCCH CSS and a collision with a discovery signal.

Operation Example 2

In Operation Example 2, when a pattern in which a discovery signal and EPDCCH CSS are mapped in the same subframe is used, an EPDCCH CSS is mapped to a resource (RE) while avoiding a resource (RE) to which a discovery signal is mapped in this subframe. Specifically, a collision between a discovery signal and EPDCCH CSS is avoided on a per-RE basis in Operation Example 2.

Figure 13:
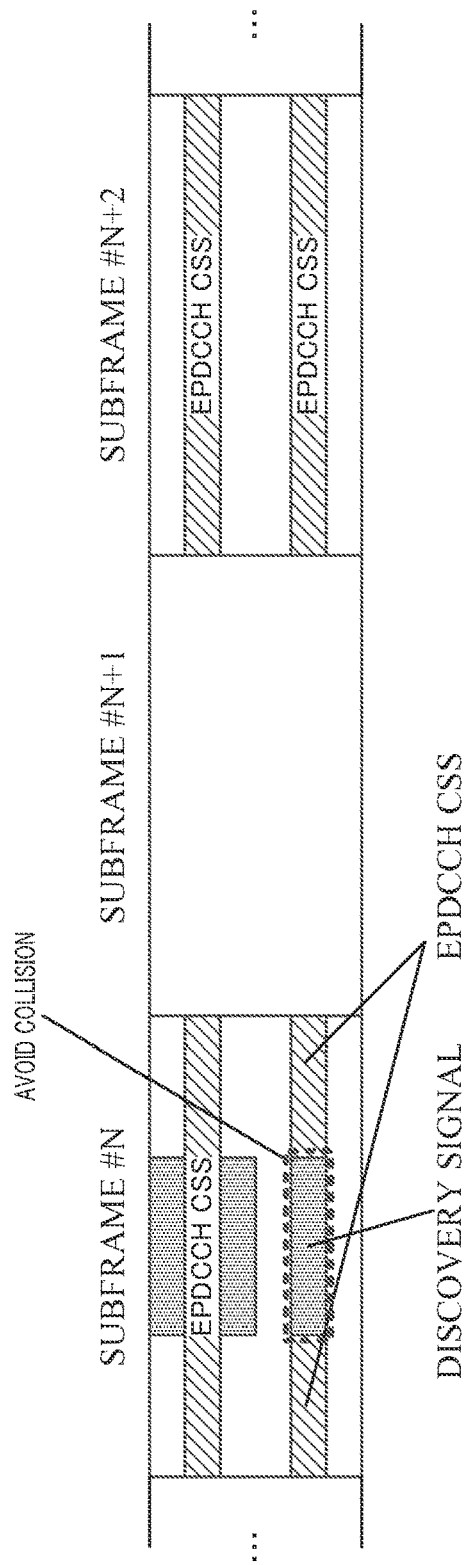
FIG. 13 is a diagram illustrating another EPDCCH CSS mapping method in each subframe according to Embodiment 2 of the present invention (Operation Example 2)

As illustrated in FIG. 13, as in Operation Example 1, it is assumed that the transmission interval of a discovery signal is 5 msec (e.g., subframe #N−10, #N−5, #N, #N+5, #N+10), and that the transmission interval of an EPDCCH CSS is 2 msec (e.g., subframe #N−4, #N−2, #N, #N+2, #N+4), for example. In this case, transmission timing at which a discovery signal and EPDCCH CSS are mapped in the same subframe and thus collide with each other corresponds to the interval of 10 msec (e.g., subframe #N−20, #N−10, #N, #N+10, #N+20).

For this reason, base station 300 (signal assignment section 301) assigns a common control signal (DCI) to a resource other than a resource (RE) to which a discovery signal is mapped among the resources indicated by the resource allocation information, at the timing when a discovery signal and EPDCCH CSS are mapped in the same subframe. Specifically, base station 300 assigns no common control signal (DCI) to a resource for EPDCCH CSS, which overlaps with a resource (RE) used for mapping a discovery signal, at the timing when a discovery signal and EPDCCH CSS are mapped in the same subframe. Likewise, terminal 400 (signal demulitplexing section 402 and common control signal receiving section 207) demultiplex the resources other than the resource (RE) to which the discovery signal is mapped from the resources indicated by the resource allocation information, at the timing when a discovery signal and EPDCCH CSS are mapped in the same subframe, and acquires a common control signal (DCT) by blindly decoding the demultiplexed resources.

As described above, in a subframe in which a discovery signal and EPDCCH CSS are both to be mapped, an EPDCCH CSS is mapped to a resource other than a resource to which a discovery signal is mapped, among the resources indicated by the resource allocation information. With this configuration, the characteristics of EPDCCH CSS may degrade unfavorably by the amount of reduction in the number of resources for EPDCCH CSS. However, if the radio quality with terminal 400 can be estimated by using RACH response and/or the like, base station 300 can reduce the degradation of characteristics of the EPDCCH CSS by using a subframe in which a discovery signal and EPDCCH CSS are to be mapped, for terminal 400 having favorable radio quality with base station 300.

Meanwhile, using a high aggregation level results in reduction in the total amount of DCI to be transmitted on the EPDCCH CSS, but makes it possible to secure the quality of EPDCCH CSS. Accordingly, the limitation on the number of resources used for EPDCCH CSS in the subframe in which a discovery signal and EPDCCH CSS are mapped can be reduced.

In addition, since terminal 400 recognizes the resource (RE) to which a discovery signal is mapped in the cell, terminal 400 can recognize that the resource for an EPDCCH CSS planned to be mapped to the RE has been subjected to puncturing or rate matching. Note that, the term "puncturing" herein refers to skipping reception of the RE to which a discovery signal is mapped while the mapping sequence of resources remains the same. The term "rate matching" used herein refers to a technique that changes coding in accordance with the number of available REs.

Moreover, as in Operation Example 1, preferentially transmitting a discovery signal over an EPDCCH CSS makes it possible to keep the detection accuracy of cells. In addition, avoiding transmission of a discovery signal and EPDCCH CSS using the same resource makes it possible to keep the quality of EPDCCH CSS, which in turn makes it possible to prevent the probability of false detection and misdetection of an EPDCCH CSS from increasing.

Operation Example 3

In Operation Example 3, when a pattern in which a discovery signal and EPDCCH CSS are mapped in the same subframe is used, an EPDCCH CSS is mapped to a resource (RE) while avoiding a resource (RE) to which a discovery signal is mapped in the subframe as in Operation Example 2.

In Operation Example 2, no EPDCCH CSS is mapped to the resource to which a discovery signal is mapped in the subframe, resulting in reduction in the number of RBs for EPDCCH CSS, however. For this reason, in Operation Example 3, in order to secure the number of RBs for EPDCCH CSS, a resource to which the EPDCCH CSS is mapped (e.g., VRB) is shifted by the number of RBs which cause a collision between a discovery signal and EPDCCH CSS. Operation Example 3 is effective particularly when the RBs to which a discovery signal is mapped are limited as in the case of PSS/SSS.

Specifically, base station 300 maps an EPDCCH CSS while shifting a resource (RB) to which the EPDCCH CSS is mapped in order to avoid a collision between a discovery signal and EPDCCH CSS at the timing when a discovery signal and EPDCCH CSS are mapped in the same subframe. Meanwhile, terminal 400 recognizes that an EPDCCH CSS is mapped so as to avoid a collision between a discovery signal and EPDCCH CSS at the timing when a discovery signal and EPDCCH CSS are mapped in the same subframe, and then identifies the EPDCCH CSS.

A description will be provided regarding a case where the number of RBs of the band is 25, and a discovery signal is mapped to a center portion of the band as in the case of a PSS/SSS as illustrated in FIG. 14. In FIG. 14, the discovery signal is mapped to PRB #9, 10, 11, 12, 13, 14, and 15 (substantially the center of band). In addition, as the resource allocation information for the EPDCCH CSS, the start position of VRBs is assumed to be VRB #8 and the number of VRBs is assumed to be 4.

In this case, when an EPDCCH CSS is mapped to 4 VRBs of VRB #8 to #11 as in Embodiment 1 (FIG. 7), the discovery signal and EPDCCH CSS collide with each other at VRB #8 and #9, i.e., PRB #9 and #13. In order to avoid a collision, two VRBs of VRB #8 and #9, where the discovery signal and EPDCCH CSS collide with each other are skipped in allocation of VRBs for the EPDCCH CSS in Operation Example 3. As a result, the EPDCCH CSS is mapped to VRB #10 to #13 in Operation Example 3. In other words, the resources to which the EPDCCH CSS is mapped become VRB #10 to #13 by shifting VRB #8 to #11 indicated by the resource allocation information by two VRBs. Accordingly, 4 VRBs are secured as the resources for EPDCCH CSS.

Figure 15:
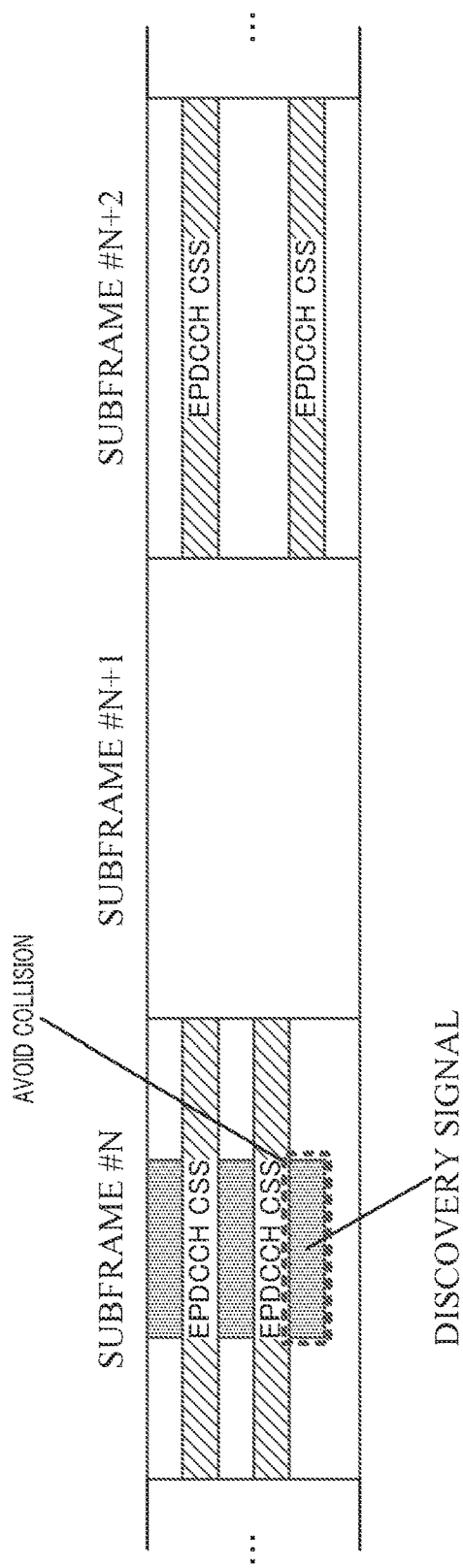
FIG. 15 is a diagram illustrating the EPDCCH CSS mapping method in each subframe according to Embodiment 2 of the present invention (Operation Example 3)

As described above, in a subframe in which a discovery signal is mapped among a plurality of subframes each pre-configured as a subframe in which an EPDCCH CSS is to be mapped, the EPDCCH CSS is mapped to a resource other than the resource to which a discovery signal is mapped, by skipping a resource that overlaps with a resource (RE) to which a discovery signal is mapped among the resources indicated by the resource allocation information. As a result, while the resources for EPDCCH CSS are secured (without any reduction in the number of resources for EPDCCH CSS), a collision between a discovery signal and EPDCCH CSS can be avoided as illustrated in FIG. 15. Stated differently, according to Operation Example 3, it is possible to keep the detection accuracy of cells while keeping the quality of EPDCCH CSS. Thus, the probability of false detection and misdetection of an EPDCCH CSS can be kept low.

Figure 16:
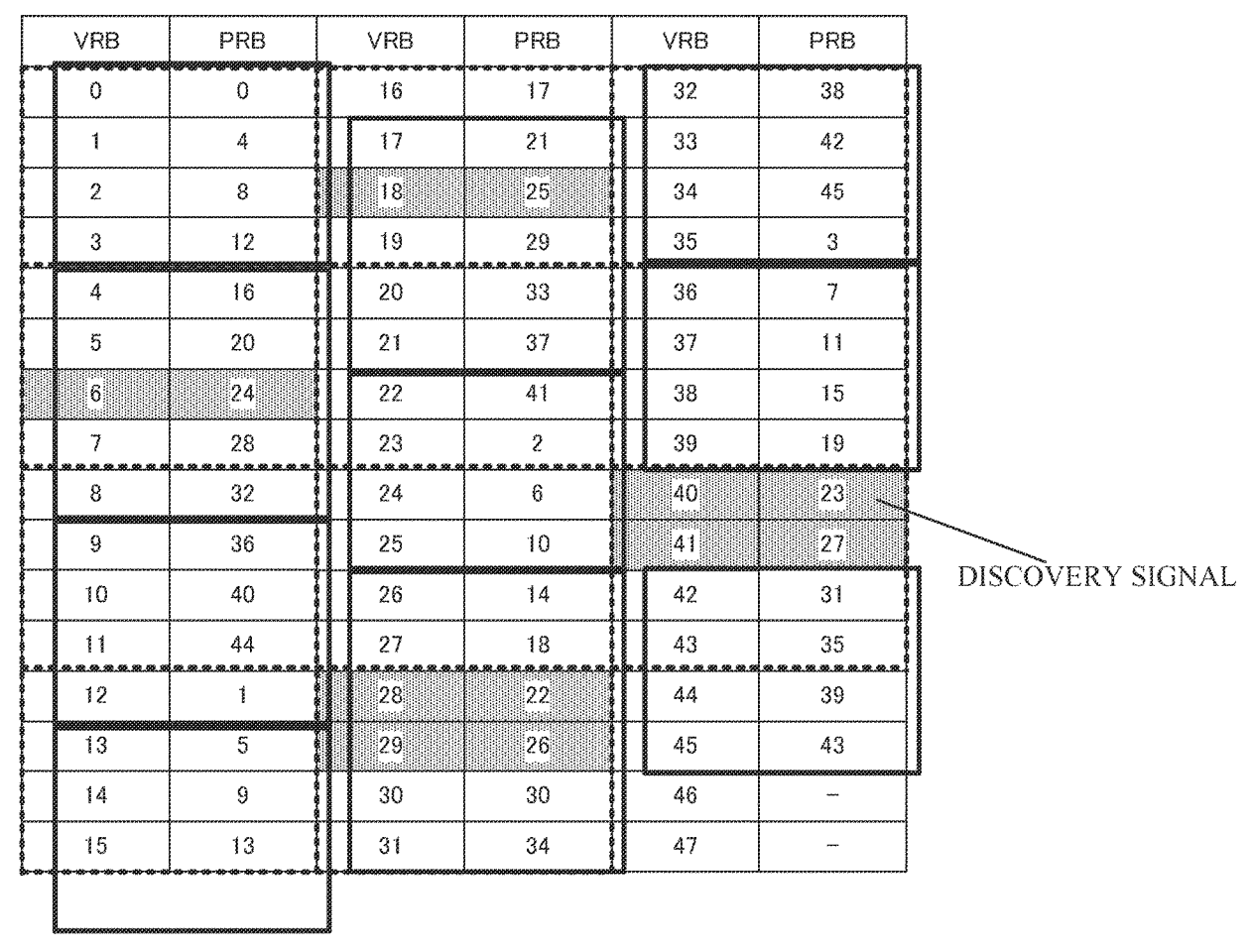

Next, a description will be provided with reference to FIG. 16 regarding a case where the number of RBs of the band is 50, for example.

In this example, it is assumed that a discovery signal is mapped to PRB #22, 23, 24, 25, 26, and 27 at a center portion of the band as in the case of a PSS/SSS. In addition, when the number of RBs of the band is 50, the number of VRBs is 46 (VRB #0 to #45). In addition, when the number of RBs of the band is 50, "step" indicating the start position of the VRBs is 4, and the candidates for the start position of VRBs are 11 in total, including VRB #0, 4, 8, . . . 40. For example, when the number of RBs for EPDCCH CSS is 4, 11 EPDCCH CSS mapping patterns (11 patterns each enclosed by a dotted line in FIG. 16) are configured as candidates for the resources forming an EPDCCH CSS. Specifically, any one of the 11 patterns is specified as the EPDCCH CSS.

Among the 11 patterns each enclosed by a dotted line in FIG. 16, a collision with a discovery signal occurs in four patterns, however.

In order to avoid a collision, the EPDCCH CSS is mapped so as to avoid a collision with a discovery signal in Operation Example 3.

Specifically, as illustrated in FIG. 16, the candidates for the start position of VRBs for EPDCCH CSS are configured to be VRB #0, 4, 9, 13, 17, 22, 26, 32, 36, and 42, and 4 RBs are configured as a single pattern which is a candidate for the resources forming an EPDCCH CSS, while the resources to which a discovery signal is mapped are avoided (i.e., patterns each enclosed by a solid line in FIG. 16). In this case, 10 EPDCCH CSS patterns which do not involve a collision with a discovery signal can be secured. In addition, an EPDCCH CSS is mapped to different RBs in the 10 patterns (no overlapping between RBs), so that a collision of EPDCCH CSS can be avoided between cells in which a discovery signal is mapped to the same RBs.

For example, base station 300 may indicate the start position of and the number of RBs for EPDCCH CSS to terminal 400. Terminal 400 recognizes, as the resources for EPDCCH CSS, one pattern corresponding to the start position of RBs from among a plurality of EPDCCH CSS patterns corresponding to the number of RBs for EPDCCH indicated by base station 300 (e.g., patterns illustrated in FIG. 16 when the number of RBs is 4). Specifically, in FIG. 16, terminal 400 identifies any one of a plurality of EPDCCH CSS patterns on the basis of the resource allocation information indicating the start position of and the number of RBs forming the EPDCCH CSS.

In the manner described above, a plurality of patterns which are candidates for the resources forming an EPDCCH CSS are pre-configured. In addition, each of the plurality of patterns is formed of a resource other than a resource to which a discovery signal is mapped. In addition, the resource allocation information for the EPDCCH CSS is information that identifies any one of the plurality of patterns. Accordingly, pre-configuring the resource mapping patterns for EPDCCH CSS by using the resources that do not involve a collision with a discovery signal allows terminal 400 to receive DCIs in the EPDCCH CSS without taking into consideration a collision between a discovery signal and EPDCCH CSS.

Note that, the resource allocation information for EPDCCH CSS is not limited to information indicating the start position of and the number of RBs forming the EPDCCH CSS. For example, the resource allocation information for EPDCCH CSS may be information indicating a pattern to be used among a plurality of patterns.

In addition, although a description has been provided regarding a case where the number of RBs of the band is 50 as an example, the number of RBs of the band is not limited to 50. For example, EPDCCH CSS patterns that do not involve a collision with a discovery signal may be pre-configured for the number of RBs other than 50 (e.g., 6, 15, 25, 75, 100 RBs).

Operation Examples 1 to 3 have been described above with respect to the method of changing an EPDCCH CSS mapping resource in base station 300 and terminal 400.

As described above, according to the present embodiment, a collision between a discovery signal (or synchronization signal) and EPDCCH CSS can be avoided.

Note that, the present embodiment has been described with a case where type 2 distributed allocation (resource allocation information for identifying the start position of and the number of RBs) is used to indicate the mapping position of an EPDCCH CSS, but the present invention is not limited to this case. For example, resource allocation information that identifies an RB or a group of RBs which correspond to the mapping position of an EPDCCH CSS may be used.

Moreover, although the embodiment has been described with a case where a collision between an EPDCCH CSS and discovery signal is avoided, this embodiment can be applied to a case where a collision between an EPDCCH CSS and NCT-MIB is avoided.

The embodiments of the present invention have been described above.

Other Embodiments

Note that, although the embodiments have been described above with a case where an EPDCCH CSS is mapped in NCT, the embodiments described above may be applied to a case where an EPDCCH CSS is mapped in BCT. In particular, in case of machine type communication (MTC) in which expansion of cell coverage is required, for example, when sufficient cell coverage cannot be secured using a CSS in a PDCCH, the cell coverage can be expanded using an EPDCCH CSS.

In the above described embodiments, an EPDCCH CSS is described as a CSS detectable based on the cell ID. In other words, the embodiments have been described regarding a case where one CSS is set in one cell. However, a plurality of CSSes may be configured in one cell while each terminal is configured to select a specific CSS from the plurality of CSSes. In this respect, a CSS used in the embodiments may be expanded in such a way that a CSS is configured on a per-UE group basis (group CSS or UE group CSS). For example, a UE group CSS may be configured in enhancement for DL-UL interference management and traffic adaptation (eIMTA), coordinated of multiple point transmission and reception (CoMP), or NS-NCT. For example, while cell IDs are used in the embodiments described above, group IDs may be used for a case where a group CSS is applied. For example, group IDs may be IDs each indicating a group of a plurality of cells employing the same configuration in eIMTA, or may be IDs each indicating a group of a plurality of cells operating coordinately in CoMP. The group IDs in this case are indicated to terminals by UE-specific higher layer signaling, for example.

The present invention has been described above by examples of hardware implementations in the above-noted embodiment, but the present invention can be also implemented by software in conjunction with hardware.

In addition, the functional blocks used in the description of the embodiments are typically implemented as LSI devices, which are integrated circuits. The functional blocks may be formed as individual chips, or a part or all of the functional blocks may be integrated into a single chip. Although the term "LSI" is used herein, the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station apparatus according to the present disclosure is a base station apparatus using a carrier configuration which includes no region for mapping a physical downlink control channel (PDCCH) and in which an enhanced physical downlink control channel (EPDCCH) is mapped in a data region, the base station apparatus including: a generating section that generates allocation information indicating one or more resources which form a search space in the EPDCCH and being scrambled with a cell ID of the base station apparatus; and a transmitting section that transmits the allocation information, a detection signal indicating the cell ID, and a control signal assigned in the search space.

In the base station apparatus according to the present disclosure, the search space is not mapped in a subframe in which the detection signal is mapped among a plurality of subframes each pre-configured as a subframe in which the search space is to be mapped.

In the base station apparatus according to the present disclosure, in a subframe in which the detection signal and the search space are both to be mapped, the search space is mapped to a resource other than a resource to which the detection signal is mapped among the resources indicated by the allocation information.

In the base station apparatus according to the present disclosure, in a subframe in which the detection signal is mapped among a plurality of subframes each pre-configured as a subframe in which the search space is to be mapped, the search space is mapped to a resource other than a resource to which the detection signal is mapped, by skipping a resource that overlaps with the resource to which the detection signal is mapped among the resources indicated by the allocation information.

In the base station apparatus according to the present disclosure: a plurality of patterns each being a candidate for one or more resources which form the search space are pre-configured; each of the plurality of patterns is formed of a resource other than a resource to which the detection signal is mapped; and the allocation information is information that identifies any one of the plurality of patterns.

In the base station apparatus according to the present disclosure: the allocation information is information that indicates a start position of and the number of the resources which are consecutive and to which the search space is mapped; and the number of resources is larger for a larger downlink bandwidth.

In the base station apparatus according to the present disclosure: each downlink bandwidth is associated with a plurality of candidates for the number of resources; and the allocation information further includes information that indicates which one of the plurality of candidates is to be used.

In the base station apparatus according to the present disclosure: a start position of the resources which are consecutive and to which the search space is mapped is determined based on the cell ID; and the allocation information is information that indicates the number of resources.

In the base station apparatus according to the present disclosure, the allocation information further includes information that indicates a period of mapping the search space.

A terminal apparatus according to the present disclosure includes: a detection section that detects a detection signal from a received signal transmitted from a base station apparatus using a carrier configuration which includes no region for mapping a physical downlink control channel (PDCCH) and in which an enhanced physical downlink control channel (EPDCCH) is mapped in a data region, the detection signal indicating a cell ID of the base station apparatus; a first receiving section that extracts allocation information from the received signal, using the cell ID, the allocation information indicating one or more resources which form a search space in the EPDCCH; and a second receiving section that extracts a control signal from the received signal by performing blind-decoding with respect to the search space.

A transmitting method according to the present disclosure is a transmitting method in a base station apparatus using a carrier configuration which includes no region for mapping a physical downlink control channel (PDCCH) and in which an enhanced physical downlink control channel (EPDCCH) is mapped in a data region, the transmitting method including: generating allocation information indicating one or more resources which form a search space in the EPDCCH and being scrambled with a cell ID of the base station apparatus; and transmitting the allocation information, a detection signal indicating the cell ID, and a control signal assigned in the search space.

A receiving method according to the present disclosure includes: detecting a detection signal from a received signal transmitted from a base station apparatus using a carrier configuration which includes no region for mapping a physical downlink control channel (PDCCH) and in which an enhanced physical downlink control channel (EPDCCH) is mapped in a data region, the detection signal indicating a cell ID of the base station apparatus; extracting allocation information from the received signal, using the cell ID, the allocation information indicating one or more resources which form a search space in the EPDCCH; and extracting a control signal from the received signal by performing blind-decoding with respect to the search space.

INDUSTRIAL APPLICABILITY

The present invention is suitable for use in mobile communication systems, for example.

REFERENCE SIGNS LIST 100, 300 Base station
200, 400 Terminal
101 Master information generating section
102 Discovery signal generating section
103 Common control signal generating section
104, 208 Error correction coding section
105, 209 Modulation section
106, 210, 301 Signal assignment section
107, 211 Transmitting section
108, 201 Receiving section
109, 203 Demodulation section
110, 204 Error correction decoding section
202, 402 Signal demultiplexing section
205, 401 Discovery signal detecting section
206 Master information receiving section
207 Common control signal receiving section

The invention claimed is:

1. A communication apparatus comprising:
   circuitry, which, in operation, generates assignment information using bits other than bits for a downlink bandwidth (dl bandwidth) and a frame number (systemFrameNumber) in a master information block (MIB), and which, in operation, maps, based on the assignment information, a control channel on a data region that is different from a region where a physical downlink control channel is mapped; and
   a transmitter, which, in operation, transmits the assignment information and the control channel to a terminal,
   wherein information related to one or more of system information, paging, and a random access channel (RACH) is transmitted by the control channel mapped on the data region and not by the physical downlink control channel.

2. A communication apparatus comprising:
   circuitry, which, in operation, generates assignment information using bits other than bits for a downlink bandwidth (dl bandwidth) and a frame number (systemFrameNumber) in a master information block (MIB), and which, in operation, maps, based on the assignment information, a control channel on a data region that is different from a region where a physical downlink control channel is mapped; and
   a transmitter, which, in operation, transmits the assignment information and the control channel to a terminal,
   wherein the control channel mapped on the data region is masked with one of a system information radio network temporary identifier (SI-RNTI), a paging RNTI (P-RNTI), and a random access RNTI (RA-RNTI).

3. A communication apparatus comprising:
   circuitry, which, in operation, generates assignment information using bits other than bits for a downlink bandwidth (dl bandwidth) and a frame number (systemFrameNumber) in a master information block (MIB), and which, in operation, maps, based on the assignment information, a control channel on a data region that is different from a region where a physical downlink control channel is mapped; and
   a transmitter, which, in operation, transmits the assignment information and the control channel to a terminal,
   wherein the circuitry, in operation, maps the control channel on the data region based on a cell ID.

4. The communication apparatus according to claim 3, wherein the transmitter, in operation, transmits a discovery signal for detecting the cell ID.

5. The communication apparatus according to claim 1, wherein the control channel is mapped on a search space, and the assignment information is related to a resource forming the search space.

6. The communication apparatus according to claim 1, wherein the circuitry, in operation, generates the assignment information scrambled by a cell ID.

7. The communication apparatus according to claim 1, wherein the control channel is mapped in a subframe other than a subframe where one of the MIB and a discovery signal for detecting a cell ID is mapped.

8. A communication apparatus comprising:
circuitry, which, in operation, generates assignment information using bits other than bits for a downlink bandwidth (dl bandwidth) and a frame number (systemFrameNumber) in a master information block (MIB), and which, in operation, maps, based on the assignment information, a control channel on a data region that is different from a region where a physical downlink control channel is mapped; and
a transmitter, which, in operation, transmits the assignment information and the control channel to a terminal,
wherein the control channel is mapped in a search space, which is determined based on a starting resource block and a number of consecutive resource blocks.

9. The communication apparatus according to claim 8, wherein the starting resource block is determined based on a cell ID.

10. The communication apparatus according to claim 1, wherein the control channel is mapped periodically.

11. A communication apparatus comprising:
circuitry, which, in operation, generates assignment information using bits other than bits for a downlink bandwidth (dl bandwidth) and a frame number (systemFrameNumber) in a master information block (MIB), and which, in operation, maps, based on the assignment information, a control channel on a data region that is different from a region where a physical downlink control channel is mapped; and
a transmitter, which, in operation, transmits the assignment information and the control channel to a terminal,
wherein a number of control channels that the terminal monitors depends on a number of resource blocks forming a search space and an aggregation level.

12. A communication method comprising:
generating assignment information using bits other than bits for a downlink bandwidth (dl bandwidth) and a frame number (systemFrameNumber) in a master information block (MIB);
mapping, based on the assignment information, a control channel on a data region that is different from a region where a physical downlink control channel is mapped; and
transmitting the assignment information and the control channel to a terminal,
wherein information related to one or more of system information, paging, and a random access channel (RACH) is transmitted by the control channel mapped on the data region and not by the physical downlink control channel.

13. A communication method comprising:
generating assignment information using bits other than bits for a downlink bandwidth (dl bandwidth) and a frame number (systemFrameNumber) in a master information block (MIB);
mapping, based on the assignment information, a control channel on a data region that is different from a region where a physical downlink control channel is mapped; and
transmitting the assignment information and the control channel to a terminal,
wherein the control channel mapped on the data region is masked with one of a system information radio network temporary identifier (SI-RNTI), a paging RNTI (P-RNTI), and a random access RNTI (RA-RNTI).

14. A communication method comprising:
generating assignment information using bits other than bits for a downlink bandwidth (dl bandwidth) and a frame number (systemFrameNumber) in a master information block (MIB);
mapping, based on the assignment information, a control channel on a data region that is different from a region where a physical downlink control channel is mapped; and
transmitting the assignment information and the control channel to a terminal,
wherein the control channel is mapped on the data region based on a cell ID.

15. A communication method comprising:
generating assignment information using bits other than bits for a downlink bandwidth (dl bandwidth) and a frame number (systemFrameNumber) in a master information block (MIB);
mapping, based on the assignment information, a control channel on a data region that is different from a region where a physical downlink control channel is mapped; and
transmitting the assignment information and the control channel to a terminal,
wherein the control channel is mapped in a search space, which is determined based on a starting resource block and a number of consecutive resource blocks.

16. A communication method comprising:
generating assignment information using bits other than bits for a downlink bandwidth (dl bandwidth) and a frame number (systemFrameNumber) in a master information block (MIB);
mapping, based on the assignment information, a control channel on a data region that is different from a region where a physical downlink control channel is mapped; and
transmitting the assignment information and the control channel to a terminal,
wherein a number of control channels that the terminal monitors depends on a number of resource blocks forming a search space and an aggregation level.

* * * * *